United States Patent
Kashima et al.

(10) Patent No.: US 9,207,485 B2
(45) Date of Patent: Dec. 8, 2015

(54) FLEXIBLE TRANSPARENT LIQUID CRYSTAL DISPLAY AND METHOD FOR PREPARING SAME

(71) Applicant: BOE Technology Group Co., Ltd., Beijing (CN)

(72) Inventors: Miki Kashima, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 13/994,741

(22) PCT Filed: Dec. 21, 2012

(86) PCT No.: PCT/CN2012/087147
§ 371 (c)(1),
(2) Date: Jun. 16, 2013

(87) PCT Pub. No.: WO2013/189162
PCT Pub. Date: Dec. 27, 2013

(65) Prior Publication Data
US 2014/0085574 A1    Mar. 27, 2014

(30) Foreign Application Priority Data
Jun. 19, 2012  (CN) .......................... 2012 1 0209506

(51) Int. Cl.
G02F 1/1333 (2006.01)
G02F 1/1334 (2006.01)

(52) U.S. Cl.
CPC ........ G02F 1/1334 (2013.01); G02F 1/133305 (2013.01); *Y10T 29/49126* (2015.01)

(58) Field of Classification Search
CPC ..................................................... G02F 1/1334
USPC ............................................................ 349/86
See application file for complete search history.

(56) References Cited

U.S. PATENT DOCUMENTS

| 6,369,867 | B1 | 4/2002 | Ge |
| 2002/0118321 | A1 | 8/2002 | Ge |
| 2005/0264725 | A1* | 12/2005 | Chari et al. .................. 349/113 |

FOREIGN PATENT DOCUMENTS

| CN | 1253302 A | 5/2000 |
| CN | 1790118 A | 6/2006 |
| CN | 101311800 A | 11/2008 |
| CN | 101419358 A | 4/2009 |
| CN | 102749750 A | 10/2012 |

OTHER PUBLICATIONS

Translation of CN101311800 Apr. 20, 2011.*

(Continued)

*Primary Examiner* — Phu Vu

(57) ABSTRACT

There is provided a flexible transparent liquid crystal display (10) comprises a first flexible substrate (101) provided with a common electrode layer (102); a second flexible substrate (105) provided with an array of pixel electrodes (103) and thin film field effect transistors (104); wherein at least one bi-stable state polymer dispersed liquid crystal layer (106) is provided between the first flexible substrate (104) and the second flexible substrate (105). There is also provided a method for preparing the same, which can increase the efficiency of the process for preparing the flexible transparent liquid crystal display.

14 Claims, 1 Drawing Sheet

(56) References Cited

OTHER PUBLICATIONS

Translation of CN10419358 Apr. 29, 2009.*
Translation of CN1253302 May 17, 2000.*
PCT International Search Report ("ISR") (Chinese Language) issued by WIPO on Jul. 2, 2013 for Chinese Patent Application No. PCT/CN2012/078147 ; thirrteen (13) pages.
The State Intellectual Property Office of the People's Republic of China ("SIPO") (Chinese Language) Office Action issued on Feb. 28, 2014 by SIPO in Chinese Patent Application No. 201210209506.4; seven (7) pages.
Translation of SIPO Rejection Decision of Chinese Patent Application No. 201210209506.4 issued on Feb. 28, 2014, five (5) pages.
English translation of CN101311800A, listed above in Foreign Patent Documents; 47 pages.
Espacenet Bibliographic Data, Abstract of CN1253302(A) (listed above in Foreign Patent Documents), 1 page.
English translation of CN101419358A, listed above in Foreign Patent Documents; 26 pages.
English translation of CN1790118A, listed above in Foreign Patent Documents; 13 pages.
English translation of CN102749750A, listed above in Foreign Patent Documents; 17 pages.
Espacenet Bibliographic Data, Abstract of CN102749750(A) (listed above in Foreign Patent Documents), 1 page.
Flexible Bistable Smectic-A LCD Based on PDLC. SID 05 Digest, E. A. Büyüktanir. pp. 1778-1781, vol. 36 Issue 1, May 2005.
Second Office Action issued by State Intellectual Property Office of the People's Republic of China, in Chinese patent application No. 201210209506.4, dated Nov. 3, 2014—3 pgs.
English Translation of Second Office Action issued by State Intellectual Property Office of the People's Republic of China, in Chinese patent application No. 201210209506.4, dated Nov. 3, 2014—1 page.
International Preliminary Report on Patentability, for PCT application No. PCT/CN2012/087147, dated Dec. 23, 2014—10 pgs.

\* cited by examiner

FLEXIBLE TRANSPARENT LIQUID CRYSTAL DISPLAY AND METHOD FOR PREPARING SAME

CROSS REFERENCE TO RELATED APPLICATIONS

This application is based on International Application No. PCT/CN2012/087147 filed on Dec. 21, 2012, which claims priority to Chinese National Application No. 201210209506.4 filed on Jun. 19, 2012 the contents of which are incorporated herein by reference.

TECHNICAL FIELD

Embodiments of the invention relate to a flexible transparent liquid crystal display and a method for preparing the same.

BACKGROUND

In recent years, with the continuous advance of science and technology, LCD (Liquid Crystal Display) technique has become more and more improved. LCDs account for a very significant share in the display field due to the advantages such as low energy consumption, readiness for making a flat screen, and environmental friendliness, etc. With the increased demands for liquid crystal display in various industries, the liquid crystal display assembles are widely applied in the various fields from small informational terminals to large transmission projection devices.

In recent years, on the basis of transparent displays, flexible transparent liquid crystal displays which are formed with flexible substrates have been proposed. This kind of liquid crystal displays has light weight, low thickness and good impact resistance. Moreover, because this kind of liquid crystal displays possesses characteristics such as softness and transparency, they can be installed on the surfaces of nonplanar objects which are in need of transparent display, for example, installed on the wind shields of vehicles or the transparent billboard screens, etc. The flexibility of flexible transparent liquid crystal displays greatly broadens the range of the application of the transparent displays.

However, currently the technique for preparing flexible transparent liquid crystal displays is still less than perfect. On one hand, the technique for preparing the flexible substrate has bottlenecks, and for example the efficiency of the process for preparing the flexible substrate is low. On the other hand, when flexible substrates are used to manufacture transparent liquid crystal displays, light transmissivity is low, and picture contrast is not high, which makes the flexible transparent liquid crystal displays cannot achieve the quality compared with that of the traditional transparent liquid crystal display when displaying images. Therefore, although flexible transparent displays have a wide range of application and in large demand, there are certain difficulties for the technique for manufacturing and cannot satisfy the demand of users.

SUMMARY

Embodiments of the invention provide a flexible transparent liquid crystal display and method for preparing the same, which can increase the efficiency of the process for preparing the liquid crystal display.

One aspect of the invention provides a flexible transparent liquid crystal display comprising a first flexible substrate provided with a common electrode layer; a second flexible substrate provided with an array of pixel electrodes and thin film field effect transistors; wherein at least one bi-stable state polymer dispersed liquid crystal layer is provided between the first flexible substrate and the second flexible substrate.

For the flexible transparent liquid crystal display, for example, the bi-stable state polymer dispersed liquid crystal layer may comprise smectic phase liquid crystal, polymerizable monomers, ions and a dichroic dye.

For the flexible transparent liquid crystal display, for example, three said bi-stable state polymer dispersed liquid crystal layers may be formed between the first flexible substrate and the second flexible substrate.

For the flexible transparent liquid crystal display, for example, the dichroic dyes in the three bi-stable state polymers dispersed liquid crystal layers may be in the colors of red, green and blue, respectively.

For example, the flexible transparent liquid crystal display may further comprise a backlight source.

For the flexible transparent liquid crystal display, for example, the surface of the first flexible substrate with the common electrode layer disposed may be a silanized surface.

Another aspect of the invention provides a method for preparing the flexible transparent liquid crystal display comprising:

Step S1, forming a common electrode layer on a first flexible substrate;

Step S2, conducting a surface treatment upon the first flexible substrate formed with the common electrode layer;

Step S3, forming at least one bi-stable state polymer dispersed liquid crystal layer between a first substrate and the common electrode layer of the first flexible substrate;

Step S4, stripping off the first substrate;

Step S5, assembling the first flexible substrate prepared with the bi-stable state polymer dispersed liquid crystal layer with the second flexible substrate provided with an array of pixel electrodes and corresponding thin film field effect transistors to form a cell.

For the method of preparation, for example, the surface treatment in Step S2 may be surface silanization for increasing a binding force between the bi-stable state polymer dispersed liquid crystal layer and the first flexible substrate.

For the method of preparation, for example, Step S3 may comprise forming three said bi-stable state polymer dispersed liquid crystal layers between the first substrate and the common electrode layer of the first flexible substrate.

For the method of preparation, for example, the dichroic dyes in the three said bi-stable state polymer dispersed liquid crystal layers may be in the colors of red, green and blue, respectively.

For the flexible transparent liquid crystal display and the method for preparing the same that are provided in embodiments of the invention, since bi-stable state polymer dispersed liquid crystal layer is employed, the color filter substrate is no longer required, which increases the light transmissivity of the flexible transparent liquid crystal display. The bi-stable state polymer dispersed liquid crystal layer that is formed between the flexible substrates can lead to a liquid crystal display which can not only retain transparency but also ensure flexibility. Since the preparation of the color filter substrate is no longer required, the process steps of the flexible transparent liquid crystal display are simplified, thereby increasing the efficiency of the process for manufacturing the flexible transparent liquid crystal display.

BRIEF DESCRIPTION OF THE DRAWINGS

In order to further illustrate the technical solution of the embodiments of the invention, the figures of the embodiments are briefly introduced below. Apparently, the figures in the following description merely concern some embodiments of the invention, rather than limiting the invention.

DETAILED DESCRIPTION

In order to make the object, technical solutions and advantages of the embodiments of the invention more clear, the technical solutions of the embodiments of the present invention are clearly and completely described below in relation to the figures of the embodiments of the present invention. Apparently, the embodiments described are merely some, rather than all embodiments of the present invention. Based on the embodiments of the invention described, any other embodiments obtained by a person of ordinary skill in the art without resorting to creative labor are within the scope of the present invention.

Unless otherwise defined, the technical or scientific terms used herein shall have the usual meaning understood by a person of ordinary skill in the art of the present invention. The wording "first", "second" and the like used in the description and claims of the present invention by no means indicates any order, quantity or significance, but are merely used to distinguishing different components. Also, "a", "an", "the" or the like does not indicate limitation of quantity, either, but rather indicates the existence of at least one. The wording "comprise", "include" or the like indicates that elements or objects preceding the "comprise" or "include" encompass the elements or objects enumerated following the "comprise" or "include", or their equivalent, but does not exclude other elements or objects. The term "link", "connect" or the like is not limited to physical or mechanical connection, but can encompass electric connection, no matter direct or indirect. "On", "under", "left" and "right", etc. are merely used to indicate relative positions, and when the absolute position of the object in question changes, these relative positions may change accordingly.

Figure 1:
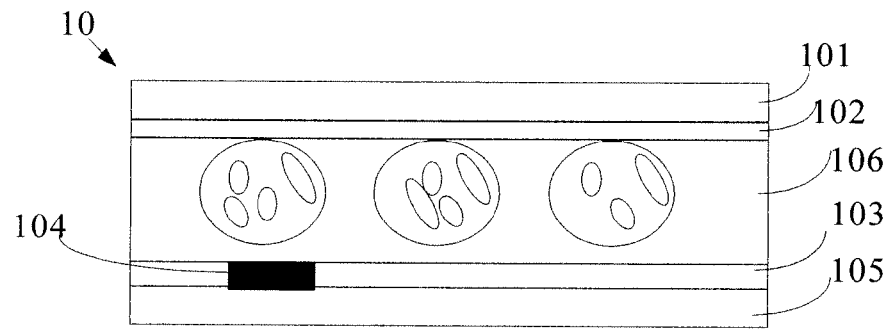
FIG. 1 is the structure diagram of the flexible transparent liquid crystal display as provided in Example 1 of the invention.

The flexible transparent liquid crystal display 10 as provided in embodiment 1 of the invention is shown in FIG. 1. The flexible transparent liquid crystal display 10 comprises a first flexible substrate 101, a second flexible substrate 105, as well as at least one bi-stable state PDLC (Polymer Dispersed Liquid Crystal) layer 106 between the first flexible substrate 101 and second flexible substrate 105.

The first flexible substrate 101 is provided with a common electrode layer 102. The common electrode layer 102, for example, may be an indium tin oxide (ITO) layer, an indium zinc oxide (IZO) layer, a tin oxide (SnOx) layer, or the like.

The second flexible substrate 105 is provided with an array of pixel electrodes 103 and corresponding thin film field effect transistors 104. That is to say, the second flexible substrate 105, for example, serves as an array substrate, for example, comprises a plurality of gate lines and a plurality of data lines, these gate lines and data lines intersecting each other and thereby defining the pixel units arranged in a matrix. Each pixel unit comprises a thin film transistor served as a switch element and a pixel electrode for controlling the alignment of liquid crystal. For example, the gate electrode of the thin film transistor in each pixel is electrically connected to or integrated with the corresponding gate line, the source electrode is electrically connected to or integrated with the corresponding data line, and the drain electrode is electrically connected to or integrated with the corresponding pixel electrode. The following description is primarily directed to single pixel unit or a plurality of pixel units, but other pixel units can be similarly formed. Accordingly, the first flexible substrate 101, as an opposite substrate, is assembled with the second flexible substrate 105 to form a liquid crystal cell.

The first flexible substrate 101 and the second flexible substrate 105, for example, may be formed by employing a material such as polyesters (for example, PET), Polyimides (PI), or the like.

It should be noted that the surface of the first flexible substrate 101 provided with the common electrode layer 102 is subjected to a surface treatment, such as surface silanization, to increase the binding force between the first flexible substrate 101 and the PDLC layer 106.

As an example, the bi-stable state PDLC layer 106 may be prepared from smectic liquid crystal, polymerizable monomers, ions and a dichroic dye. The bi-stable state PDLC layer 106, for example, may be obtained by a known method, for example, see Ebru A. Büyüktanir et al., "Flexible Bi-stable Smectic-A LCD Based on PDLC" (SID Symposium Digest of Technical Papers, Volume 36, Issue 1, pages 1778-1781, May 2005), which is incorporated here by reference in its entirety.

The dichroic dye can be a red dye, a green dye, and a blue dye, etc. Hence, the bi-stable state PDLC layer 106 can replace the color filter substrate for providing the three primary colors. A color filter substrate is not required any more to be provided in the flexible transparent liquid crystal display 10, thereby increasing the transmissivity of this display. The red dye, the green dye, and the blue dye, for example, can employ known dyes in the art.

Furthermore, the cell gap of the liquid crystal cell formed with the first flexible substrate 101 and the second flexible substrate 105 can be controlled to be 10 micrometers to 50 micrometers with spacers (for example, glass beads or glass fibers). Thereby, the bi-stable state PDLC layer 106 prepared can have a thickness of 5 micrometers to 45 micrometers.

Figure 2:
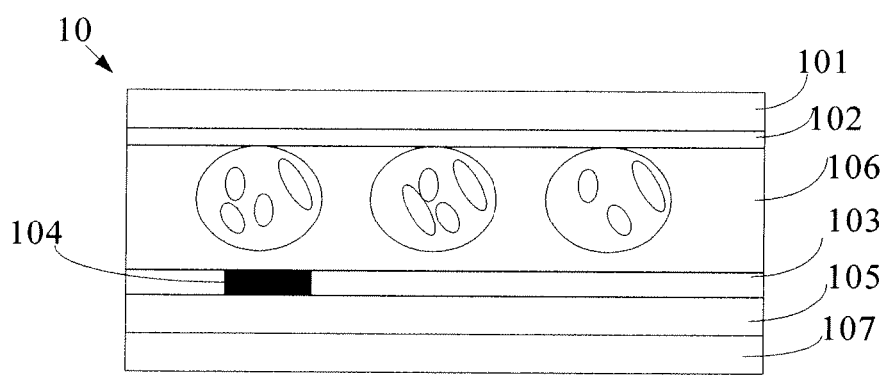
FIG. 2 is the structure diagram of the flexible transparent liquid crystal display as provided in Example 2 of the invention.

The flexible transparent liquid crystal display 10 as provided in embodiment 2 is shown in FIG. 2, which may further comprise a backlight source 107 which is disposed under (or behind) the second flexible substrate 105, in the opposite side to the bi-stable state PDLC layer 106. The backlight source 107, for example, may be a side irradiation type or a straight-down irradiation type.

Figure 3:
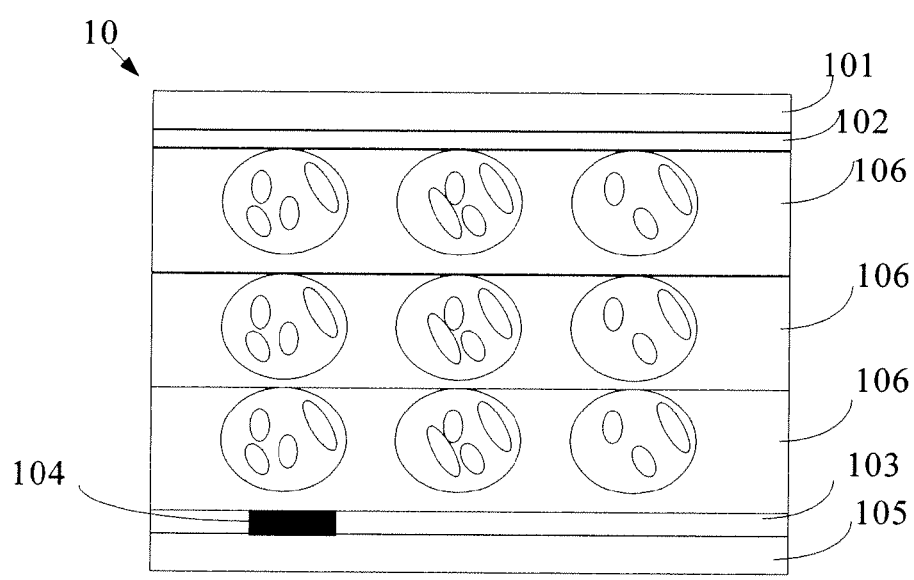
FIG. 3 is the structure diagram of the flexible transparent liquid crystal display as provided in Example 3 of the invention.

The flexible transparent liquid crystal display 10 as provided in embodiment 3 is shown in FIG. 3, which comprises three bi-stable state polymer dispersed liquid crystal layers 106 formed between the first flexible substrate 101 and the second flexible substrate 105.

It should be noted that the bi-stable state PDLC layers 106 may be prepared from smectic liquid crystal, polymerizable monomers, ions and various dichroic dyes. For example, the first bi-stable state PDLC layer 106 is prepared from smectic liquid crystal, polymerizable monomers, ions and a red dye; the second bi-stable state PDLC layer 106 is prepared from smectic liquid crystal, polymerizable monomers, ions and a green dye; and the third bi-stable state PDLC layer 106 is prepared from a smectic liquid crystal, polymerizable monomers, ion and a blue dye. In another example, the first bi-stable state PDLC layer 106 is prepared from smectic liquid crystal, polymerizable monomers, ions and a green dye; the second bi-stable state PDLC layer 106 is prepared from smectic liquid crystal, polymerizable monomers, ions and a blue dye; and the third layer bi-stable state PDLC layer 106 is prepared from smectic liquid crystal, polymerizable monomers, ions and a red dye. In yet another example, the first bi-stable state PDLC layer 106 is prepared from smectic liquid crystal, polymerizable monomers, ions and a red dye; the second bi-stable state PDLC layer 106 is prepared from smectic liquid crystal, polymerizable monomers, ions and a blue dye; and the third bi-stable state PDLC layer 106 is prepared from smectic liquid crystal, polymerizable monomers, ions and a green dye. So forth, there may be other ways by which the dichroic dyes of three colors are arranged in the three bi-stable state PDLC layers 106. The illustration hereby is merely exemplary. The flexible transparent liquid crystal display 10 prepared with other arrangement of dichroic dyes are within the scope of the invention.

FIG. 3 merely illustrates the flexible transparent liquid crystal display 10 without being provided with a backlight source as an example. The flexible transparent liquid crystal display 10 of this example may be disposed with a backlight source. The invention is not limited hereto.

Embodiments of the invention provide a flexible transparent liquid crystal display 10 comprising a first flexible substrate 101 provided with a common electrode layer 102, a second flexible substrate 105 provided with an array comprising pixel electrodes 103 and thin film field effect transistors 104, and at least one bi-stable state PDLC layer 106 therebetween. Due to the employment of the bi-stable state PDLC layer 106, the color filter substrate is no longer required, which increases the light transmissivity of the flexible transparent liquid crystal display 10. The liquid crystal display manufactured by forming the bi-stable state PDLC layer 106 between the flexible substrates can not only retain transparency but also ensure flexibility. Since the preparation of the color filter substrate is no longer required, the process steps of the flexible transparent liquid crystal display can be simplified, thereby increasing the efficiency of the process for manufacturing the flexible transparent liquid crystal display.

An embodiment of the invention provides a method for preparing a flexible transparent liquid crystal display, which may comprise the following steps:

Step S1, forming a common electrode layer on a first flexible substrate.

For example, an indium tin oxide (ITO) layer is formed on the first flexible substrate.

Step S2, conducting a surface treatment upon the first flexible substrate formed with the common electrode layer.

For example, the first flexible substrate formed with the common electrode layer is subjected to a surface silanization treatment which is used to increase the binding force between the bi-stable state PDLC layer and the first flexible substrate.

The first flexible substrate is subjected to the surface silanization pretreatment, for example, the ITO film can be subjected to the surface pretreatment with a polymerizable silane coupling agent to enhance the interfacial binding force between the polymer network and the ITO film. The coupling by the silane coupling agent is achieved by the following reaction steps. For example, the Si—X groups in the silane coupling agent is subjected to hydrolysis, thus Si—OH (silicon hydroxide) is generated; Si—OH is subjected to dehydration condensation to generate siloxane oligomer containing Si—OH; then Si—OH in the siloxane oligomer reacts with the —OH groups in the surface of the first flexible substrate to form hydrogen bonds; finally, with a heating process, dehydration condensation occurs between Si—OH contained in the siloxane oligomer and —OH groups in the surface of the first flexible substrate to form covalent bonds between the silane coupling agent and the surface of the first flexible substrate, thereby achieving the surface silanization treatment upon the first flexible substrate.

Step S3, forming at least one bi-stable state polymer dispersed liquid crystal layer between a first substrate and the common electrode layer of the first flexible substrate.

During preparation, first a suitable amount of bi-stable state polymer liquid crystal materials (in a liquid state before solidified) is dripped on the first flexible substrate. Spacers (for example, bead spacers or glass fibers) can be distributed together with this liquid crystal material. Then, for example, the first substrate is assembled from above to the first flexible substrate to form a liquid crystal cell. After the assembly, ultraviolet light is used to solidify the liquid crystal material. After the completion of the solidification, the bi-stable state polymer liquid crystal layer is formed between the first substrate and the first flexible substrate. The first substrate may be a flexible substrate or a rigid substrate (for example, a glass substrate).

By means of the first substrate, first the thickness of the bi-stable state polymer liquid crystal layer can be controlled, otherwise the thickness of the liquid crystal layer cannot be formed evenly; second, some polymer materials are anaerobic, and thus is not easy to solidify when contacting with the air, and with the first substrate these polymer materials can be prevented from the air.

It should be noted that smectic liquid crystal, ions, polymerizable monomers and a dichroic dye can be used to prepare the bi-stable state PDLC layer. Also, it should be noted that the optical properties of the bi-stable state PDLC layer depend, to a great extent, on the effective refractive index of the smectic liquid crystal molecules, and the degree of the match in the polymeric matrix. That is to say, by selecting different polymerizable monomers, such as the polymerizable monomer of acrylate type or epoxy resin type and smectic liquid crystal, for example smectic A phase liquid crystal, the effective refractive index of the PDLC layer can be adjusted. For a colored PDLC layer with the addition of a dichroic dye, based on the requirement of the liquid crystal display on the effective refractive index of light (for example, the liquid crystal display needs an effective refractive index of 1.5 for light), the smectic liquid crystal and polymeric monomers which have suitable effective refractive indices can be employed to obtain this effective refractive index. If smectic A phase liquid crystal doped with ions and polymerizable monomers of an acrylate type, a PDLC layer with a refractive index of 1.5 can be obtained. The smectic A phase liquid crystal doped with ions has a refractive index of about 1.7 to extraordinary light and a refractive index of about 1.5 to ordinary light. It should be noted, ordinary light refers to one of the two beams of refracted light in the birefringence occurred when light is transmitted through a uniaxial crystal, which obeys the refraction law. The refractive indices of the polymerizable monomers of an acrylate type are about 1.5.

Furthermore, due to the different refractive indices of the smectic liquid crystals, it is necessary to select a kind of polymerizable monomers with a corresponding refractive index to achieve the effective refractive index. Generally, smectic liquid crystal has a refractive index to extraordinary light in the range of 1.5~1.7 and a refractive index to ordinary light in the range of 1.4~1.6. The acrylate type or epoxy resin type of polymerizable monomers, which has a refractive index in the range of 1.4~1.6, can be selected as long as the refractive index to extraordinary light is in the range of 1.4~1.6, thereby achieving the effective refractive index required for the liquid crystal display.

It should be noted that when applying a low frequency voltage, the smectic liquid crystal molecules in the bi-stable state PDLC layer are a disordered focal conic structure, so the incoming light is reflected and refracted at the interface between the smectic liquid crystal and polymers, and it exhibits the scattering state and displays a color; and even after the withdrawal of the low frequency voltage, the smectic liquid crystal molecules still retain the scattering state and display a color. On the other hand, when a high frequency voltage is applied, the smectic liquid crystal molecules will be arranged along the direction of the electric field, the incoming light will not be reflected or refracted, and can transmit through the liquid crystal layer, thereby making the display in the transparent state. Similarly, after the withdrawal of the high frequency voltage, the smectic liquid crystal molecules can also retain the transparent state. Due to the property of the bi-stable state PDLC layer that can retain the state that occurs prior to the withdrawal of the voltage even after the withdrawal of the voltage, with the bi-stable state PDLC layer, the energy consumption of the liquid crystal display can be reduced.

As an example, three bi-stable state PDLC layers are formed between the first substrate and the common electrode layer of the first flexible substrate, and the dichroic dyes for preparing the bi-stable state PDLC layers are a red dye, a green dye and a blue dye, respectively.

Step S4, stripping off the first substrate.

It should be noted that the first substrate is not subjected to the surface treatment, for example, has not been subjected to the surface silanization treatment, and thus the interfacial binding force between the bi-stable state PDLC layer and the first substrate is rather weak; however, the first flexible substrate is subjected to the surface silanization treatment, and the interfacial binding force between the first flexible substrate and the bi-stable state PDLC layer is strong. Therefore, the first substrate can be stripped off from the bi-stable state PDLC layer without affecting the binding between the first bi-stable state PDLC layer and the first flexible substrate.

Step S5, aligning the first flexible substrate prepared with the bi-stable state PDLC layer thereon in opposition to the second flexible substrate provided with an array of pixel electrodes and corresponding thin film field effect transistors.

For example, the first flexible substrate, from which the first substrate has been stripped off, and which has a PDLC layer prepared thereon, is aligned in opposition to the second flexible substrate provided with an array of pixel electrodes and corresponding thin film field effect transistors to form a liquid crystal cell. Moreover, for example, glass beads can be used to control the cell thickness, and for example, the cell thickness may be controlled to be in a range of 10 micrometers to 50 micrometers with glass beads.

Embodiments of the invention provide a flexible transparent liquid crystal display and a method for preparing the same. In the flexible transparent liquid crystal display, at least one bi-stable state polymer dispersed liquid crystal layer is formed between a first flexible substrate provided with a common electrode layer and a second flexible substrate provided with an array of pixel electrodes and corresponding thin film field effect transistors. Since bi-stable state polymer dispersed liquid crystal layer can be employed, the color filter substrate may be no longer required, which increases the light transmissivity of the flexible transparent liquid crystal display. A bi-stable state polymer dispersed liquid crystal layer formed between the flexible substrates can make a liquid crystal display which can not only retain transparency but also ensure flexibility. Since the preparation of the color filter substrate is no longer required, the process steps of the flexible transparent liquid crystal display can be simplified, thereby increasing the efficiency of the process for manufacturing the flexible transparent liquid crystal display.

The aforementioned are merely specific embodiments of the invention. The scope of the invention is determined according to the accompanying claims.

The invention claimed is:

1. A flexible transparent liquid crystal display comprising: a first flexible substrate provided with a common electrode layer; and a second flexible substrate provided with an array of pixel electrodes and thin film field effect transistors; wherein at least one bi-stable state polymer dispersed liquid crystal layer is provided between the first flexible substrate and the second flexible substrate.

2. The flexible transparent liquid crystal display according to claim 1, wherein the bi-stable state polymer dispersed liquid crystal layer comprises smectic phase liquid crystal, polymerizable monomers, ions and a dichroic dye.

3. The flexible transparent liquid crystal display according to claim 1, wherein three bi-stable state polymer dispersed liquid crystal layers are provided between the first flexible substrate and the second flexible substrate.

4. The flexible transparent liquid crystal display according to claim 3, wherein the dichroic dyes in the three bi-stable state polymer dispersed liquid crystal layers are in the colors of red, green and blue, respectively.

5. The flexible transparent liquid crystal display according to claim 1, wherein the flexible transparent liquid crystal display further comprises a backlight source.

6. The flexible transparent liquid crystal display according to claim 1, wherein a surface of the first flexible substrate provided with the common electrode layer disposed is a silanized surface.

7. A method for preparing the flexible transparent liquid crystal display comprising: Step S1, forming a common electrode layer on a first flexible substrate; Step S2, conducting a surface treatment upon the first flexible substrate formed with the common electrode layer; Step S3, forming at least one bi-stable state polymer dispersed liquid crystal layer between a first substrate and the common electrode layer of the first flexible substrate; Step S4, stripping off the first substrate; Step S5, assembling the first flexible substrate provided with the bi-stable state polymer dispersed liquid crystal layer with a second flexible substrate provided with an array of pixel electrodes and corresponding thin film field effect transistors to form a cell.

8. The method according to claim 7, wherein the bi-stable state polymer dispersed liquid crystal layer comprises smectic phase liquid crystal, polymerizable monomers, ions and a dichroic dye.

9. The method according to claim 7, wherein the surface treatment in Step S2 is surface silanization for increasing a binding force between the bi-stable state polymers dispersed liquid crystal layer and the first flexible substrate.

10. The method according to claim 7, wherein Step S3 comprises forming three said bi-stable state polymer dispersed liquid crystal layers between the first substrate and the common electrode layer of the first flexible substrate.

11. The method according to claim 10, wherein the dichroic dyes in the three bi-stable state polymer dispersed liquid crystal layers are in the colors of red, green and blue, respectively.

12. The flexible transparent liquid crystal display according to claim 3, wherein the flexible transparent liquid crystal display further comprises a backlight source.

13. The flexible transparent liquid crystal display according to claim 3, wherein a surface of the first flexible substrate provided with the common electrode layer disposed is a silanized surface.

14. The method according to claim 10, wherein the surface treatment in Step S2 is surface silanization for increasing a binding force between the bi-stable state polymer dispersed liquid crystal layer and the first flexible substrate.

\* \* \* \* \*